Jan. 4, 1949. W. H. FORMHALS ET AL 2,457,994
DOUBLE-END VENTILATED MOTOR
Filed March 13, 1947

WITNESSES:
Edward Michaels
Nw. C. Groome

INVENTORS
William H. Formhals &
James H. Penney.
BY O. B. Buchanan
ATTORNEY

Patented Jan. 4, 1949

2,457,994

UNITED STATES PATENT OFFICE 2,457,994

DOUBLE-END-VENTILATED MOTOR

William H. Formhals and James H. Penney, Buffalo, N. Y., assignors to Westinghouse Electric Corporation, East Pittsburgh, Pa., a corporation of Pennsylvania Application March 13, 1947, Serial No. 734,502

3 Claims. (Cl. 171—252)

Our invention relates to double-end-ventilated dynamo-electric machines, that is, machines having a ventilating-fan at each end. While our invention is not altogether limited to one particular electrical type of motor, it was particularly designed for, and will be illustrated and described in connection with, a line of general-purpose commercial induction-motors having cast squirrel-cage windings.

More particularly still, our invention is related to a new type of convertible-motor design, as covered by an application of Ludwig, Fockler, Formhals and Walton, Serial No. 690,628, filed August 15, 1946, whereby the same stator-parts are utilized, to a very wide extent, in building a number of different ventilation-types of the same motor, such as open, drip-proof, protected, splash-proof protected, totally enclosed fan-cooled, totally enclosed non-ventilated, explosion-resistant, and perhaps other types.

It is an object of our invention to provide an open or protected motor of the double-fan-ventilated type, which is quieter and more efficient than the single-end-ventilated motors which have previously been utilized in the above-mentioned convertible series, but our new motor still retains the imperforate-frame feature which is essential to the convertible series.

Thus, in the single-end-ventilated motor, the air is drawn in through one bracket, by means of a fan on the rotor, and is passed over the stator-core and exhausted through openings in the other bracket. In the previously known double-end-ventilated motors, the air is taken in through both brackets, and exhausted through openings in the frame-structure. In our present invention, the air is taken in through a series of inlet-perforations in both brackets, but it is exhausted through a series of exhaust-perforations in one or both brackets, so that no perforations have to be provided in the stator-frame for exhausting the air, suitable baffles being provided for taking care of the air-circulation.

With the foregoing and other objects in view, our invention consists in the systems, combinations, structures, parts, and ventilating and manufacturing means and methods, hereinafter described and claimed, and illustrated in the accompanying drawing, wherein the three figures are longitudinal sectional views of different forms of embodiment of our invention.

Figure 1:
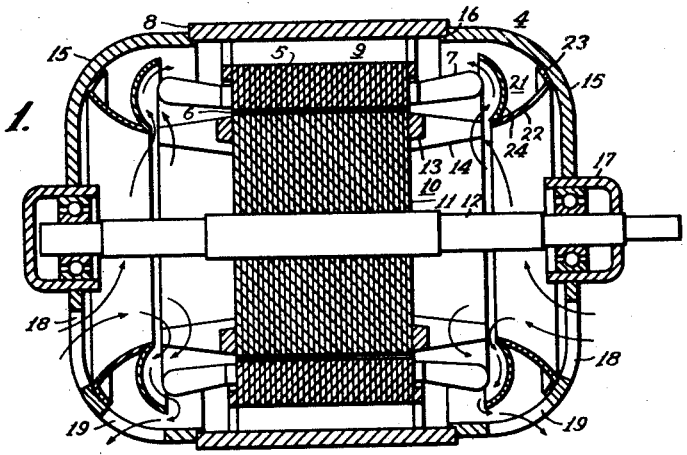

Fig. 1 shows our ventilation-method as applied to induction-motors of ratings in the range from 5 horsepower to 40 or 75 horsepower, more or less. These motors comprise a stator-member 4, having a laminated stator-core 5 with a cylindrical airgap-bore 6. The stator-core carries stator-windings, which are the primary windings of the machine, having end-turns 7 projecting from each end of the stator-core. The stator-member also includes an imperforate frame-ring 8, extending around the stator-core 5 in spaced relation to at least a portion of said stator-core, so as to provide one or more axially extending stator-ventilating passageways or ducts 9, outside of said stator-core and inside of the stator-frame 8.

The motor also includes a rotor-member 10, having a cylindrical laminated rotor-core 11, mounted on a shaft 12 and carrying a die-cast squirrel-cage winding 13, usually of aluminum. The rotor-member also includes two substantially radially blowing fan-means 14, disposed to blow air onto the stator end-turns 7 at the respective ends of the machine. These fan-means are shown in the form of fan-blades 14 which are cast integrally with the squirrel-cage winding 13, in a single casting-operation, in a known manner.

The motor-structure is completed by two end-brackets 15, one at each end of the machine, each bracket having an outer peripheral cylindrical-registry portion 16, engaging its end of the stator-frame 8 or other outer peripheral portion of the stator-member. Each bracket 15 also carries a centrally disposed shaft-supporting bearing 17. In the form of embodiment of our invention which is shown in Fig. 1, each of the two brackets 15 has two sets of ventilating-openings, namely, inlet-openings 18, which are disposed near the bearing, for supplying air to the inlet-portion of the fan-means at that end of the machine, and exhaust-openings 19, disposed nearer to the periphery of the bracket, for exhausting substantially all of the air which is acted upon by the fan-means at that end of the machine. In the illustrated forms of embodiment of our invention, the motor is shown, in each case, as a drip-proof protected type of motor, which means that the top half or hemisphere of each bracket 16 is imperforate, and the ventilating-vents are provided exclusively in the bottom halves or hemispheres of the respective brackets.

In the motor which is shown in Fig. 1, the brackets 15 are each provided with baffles 21 which provide a directed air-path from the inlet-openings 18, through the fan-means 14, over the stator end-turns 7, and finally out of exhaust-openings 19 at that end of the machine, as indicated by the arrows. This action takes place on both ends of the machine, and provides an efficient and adequate ventilation-system, particularly in the size-ranges indicated.

As shown in Fig. 1, the baffles 21 are of annular shape, having a base-flange 22 which is secured to the inner surface of the associated bracket 15, and an angularly directed annular flange 23, which extends inwardly from the bracket 15 and supports a curved shroud or baffle 24 which directs the air over and around the stator end-turns 7.

Figure 2:
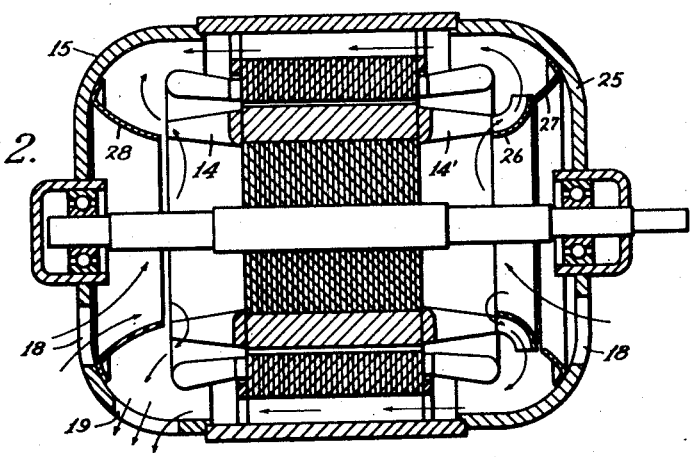

Fig. 2 shows the application of our invention to a machine in which it is desirable to pass the ventilating-air over the back of the stator-punchings or core 5, in order to get additional cooling from the iron. This expedient is desirable in some of the larger sizes of motors. This result is accomplished by omitting the exhaust-openings 19 in one of the brackets, as shown by the right-hand bracket 25 in Fig. 2, so that the air which is drawn in, through the inlet-openings 18 in that bracket, is forced to travel axially through the stator-ducts 9, back of the stator core, so as to be exhausted through the exhaust-openings 19 in the left-hand bracket 15 of the motor, as shown in Fig. 2.

Any suitable form of baffling-means may be provided, in Fig. 2, for directing the air-paths in the manner just described. The baffling-means may be similar to the baffles 21 shown in Fig. 1, or variations may be made. Fig. 2 shows two different forms of baffling means, at the respective ends of the machine, although it is to be understood that the same form could be utilized at both ends, or various other forms of baffling-means could be utilized.

At the right-hand end of the machine, as shown in Fig. 2, the fan-means 14' at this end is provided with a rotating shroud, or shroud-like attachment 26, which cooperates with a small annular stationary shroud or baffle 27 which projects, into close proximity with said rotating shroud, from the end-bracket 25, so as to direct the incoming air under the rotating shroud 26 and into the inlet-portion of the fan-means 14 at end of the machine.

At the left-hand end of the machine, as shown in Fig. 2, a single stationary shroud or baffle 28 is utilized, which is attached to the left-hand bracket 15 in an annular region between the series of inlet and exhaust-openings 18 and 19, said baffle 28 extending down into proximity with the end of the fan-blades 14 at that end of the machine, in a manner similar to the baffles 22 of Fig. 1. The paths of the ventilating air in Fig. 2 are indicated by arrows.

It will be understood that the two fan-means 14, at the opposite ends of the rotor-member in Fig. 2, may be either identical in size or capacity, or they may be of different sizes, within the province of the designer.

Figure 3:
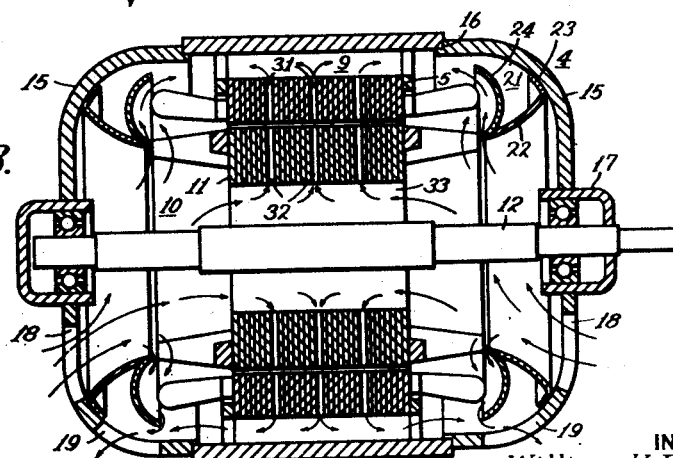

Fig. 3 shows a ventilation-method, in accordance with our invention, which is particularly applicable to the larger motor-sizes, in which radial ducts 31 and 32 are provided in both the stator and rotor cores 5 and 11, the rotor-core 11 being also provided with one or more axially extending rotor-ventilating passageways or ducts 33 communicating with the inner ends of the radial ventilating-openings 32 of said rotor-core. The construction and ventilating operation of the motor shown in Fig. 3 is otherwise the same as that which has been described in connection with Fig. 1, the only difference being that the Fig. 3 construction permits some of the ventilating-air, at each end of the machine, to enter the axially extending rotor ventilating passageways 33 at that end of the machine, thence passing through radial ventilating-openings 32 and 31 of the rotor and stator cores 11 and 5, respectively, and returning, through the axially extending stator-ventilating passageways 9, to the same end of the machine, as indicated by the arrows in Fig. 3.

It is a characteristic of all of the illustrated forms of embodiment of our double-end-ventilated motors, that they have a lower windage-loss, and less noise, than single-end-ventilated motors. At the same time, our novel double-end ventilation-arrangements avoid the necessity for utilizing perforated frames, such as were utilized in the previously mentioned old forms of double-end-ventilated motors. The imperforate or completely enclosed frames of our new motors thus provide better motor-protection than the perforated frames, and also preserve the versatility or interchangeability of stator-parts which make the same parts utilizable, by the manufacturer, in the various types of enclosures in which the motors have to be supplied, for different customers and different uses or motor-applications.

While we have illustrated our invention in only three forms of embodiment, all limited to commercial induction-motors having cast squirrel-cage windings, and all limited to protected motor-enclosures of the drip-proof type, we wish it to be understood that our invention is applicable to other motors and types, and that various changes may be made in details. We desire, therefore, that the appended claims shall be accorded the broadest construction consistent with their language.

We claim as our invention:

1. A double-end-ventilated dynamo-electric machine comprising: a stator-member having a laminated stator-core with an airgap-bore, stator-windings having end-turns projecting from each end of the stator-core, and an imperforate stator-frame extending around the stator-core in spaced relation to at least a portion of said stator-core so as to provide one or more axially extending stator-ventilating passageways outside of said stator-core and inside of the stator-frame; a rotor-member having a laminated rotor-core, a shaft, and substantially radially blowing fan-means disposed to blow air onto the stator end-turns at each end of the machine; and two end-brackets, one at each end of the machine, each end-bracket having an outer peripheral registry-portion engaging its end of the stator-frame, and a centrally disposed shaft-supporting bearing carried by each bracket; one of the brackets having only inlet ventilating-openings, disposed near the bearing; the other bracket having inlet-openings disposed near its bearing, and also exhaust-openings disposed nearer to the periphery of the bracket for exhausting all of the air admitted into the machine through the inlet-openings in both brackets; and means for providing directed air-paths within the machine from the inlet-openings, through the two fan-means, over both stator end-turns, through the axially extending stator-ventilating passageways from the non-exhausting to the exhausting end of the machine, and finally out of said exhaust-openings.

2. A double-end-ventilated dynamo-electric machine comprising: a stator-member having a laminated stator-core with an airgap-bore, said stator-core having a plurality of radial ventilating-openings therein, stator-windings having end-turns projecting from each end of the stator-core, and an imperforate stator-frame extending around the stator-core in spaced relation to at least a portion of said stator-core so as to provide one or more axially extending stator-ventilating passageways outside of said stator-core and inside of the stator-frame; a rotor-member having a laminated rotor-core having a plurality of radial ventilating-openings therein, and having one or more axially extending rotor-ventilating passageways communicating with the inner ends of said radial ventilating-openings of said rotor-core, said rotor-member also including a shaft, and substantially radially blowing fan-means disposed to blow air onto the stator end-turns at each end of the machine; and two end-brackets, one at each end of the machine, each end-bracket having an outer peripheral registry-portion engaging an outer peripheral portion of the stator-member, and a centrally disposed shaft-supporting bearing carried by each bracket; the machine having a plurality of ventilating-openings variously disposed in the two brackets, said ventilating-openings including inlet-openings disposed near the bearing in both brackets for supplying air to the inlet-portions of the two fan-means, the ventilating-openings comprising exhaust-openings disposed nearer to the periphery of at least one of the brackets for exhausting all of the air admitted into the machine through said inlet-openings; and means for providing directed air-paths within the machine from the inlet-openings, through the two fan-means, over both stator end-turns, and finally out of said exhaust-openings; the air-path means permitting some of the ventilating-air to enter the axially extending rotor-ventilating passageways, thence passing through radial ventilating-openings of the rotor and stator cores, and thence passing through the axially extending stator-ventilating passageways.

3. A double-end-ventilated dynamo-electric machine comprising: a stator-member having a laminated stator-core with an airgap-bore, said stator-core having a plurality of radial ventilating-openings therein, a stator-winding having end-turns projecting from each end of the stator-core, and an imperforate stator-frame extending around the stator-core in spaced relation to at least a portion of said stator-core so as to provide one or more axially extending stator-ventilating passageways outside of said stator-core and inside of the stator-frame; a rotor-member having a laminated rotor-core having a plurality of radial ventilating-openings therein, and having one or more axially extending rotor-ventilating passageways communicating with the inner ends of said radial ventilating-openings of said rotor-core, said rotor-member also including a shaft, and substantially radially blowing fan-means disposed to blow air onto the stator end-turns at each end of the machine; and two end-brackets, one at each end of the machine, each end-bracket having an outer peripheral registry-portion engaging an outer peripheral portion of the stator-member, and a centrally disposed shaft-supporting bearing carried by each bracket; each bracket having two sets of ventilating-openings, namely inlet-openings disposed near the bearing for supplying air to the inlet-portion of the fan-means at that end of the machine, and exhaust-openings disposed nearer to the periphery for exhausting substantially all of the air which is delivered by the fan-means at that end of the machine, each bracket having baffle-means for providing a directed air-path from the inlet-openings, through the fan-means, over the stator end-turns, and finally out of the exhaust-openings at that end of the machine; the air-path means permitting some of the ventilating-air at each end of the machine to enter the axially extending rotor-ventilating passageways at that end of the machine, thence passing through radial ventilating-openings of the rotor and stator cores, and returning through the axially extending stator-ventilating passageways.

WILLIAM H. FORMHALS.
JAMES H. PENNEY.

REFERENCES CITED

The following references are of record in the file of this patent:

UNITED STATES PATENTS

| Number | Name | Date |
| --- | --- | --- |
| 1,086,818 | Gray | Feb. 10, 1914 |
| 1,578,918 | Powell | Mar. 30, 1926 |
| 1,685,677 | Maxwell | Sept. 25, 1928 |
| 2,357,923 | Anderson | Sept. 12, 1944 |

FOREIGN PATENTS

| Number | Country | Date |
| --- | --- | --- |
| 383,674 | Great Britain | Nov. 24, 1932 |